United States Patent
Feil et al.

(10) Patent No.: US 10,613,207 B2
(45) Date of Patent: Apr. 7, 2020

(54) METHOD AND SYSTEM FOR ANALYZING AN ENVIRONMENT OF A MOBILE TERMINAL

(71) Applicant: OSRAM GmbH, Munich (DE)

(72) Inventors: Henry Feil, Unterhaching (DE); Florian Wildner, Munich (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/062,633

(22) PCT Filed: Nov. 8, 2016

(86) PCT No.: PCT/EP2016/076928
§ 371 (c)(1),
(2) Date: Jun. 15, 2018

(87) PCT Pub. No.: WO2017/102178
PCT Pub. Date: Jun. 22, 2017

(65) Prior Publication Data
US 2018/0372854 A1 Dec. 27, 2018

(30) Foreign Application Priority Data
Dec. 16, 2015 (DE) .................. 10 2015 225 388

(51) Int. Cl.
*G01S 11/06* (2006.01)
*G01S 5/02* (2010.01)
(Continued)

(52) U.S. Cl.
CPC ............. *G01S 11/06* (2013.01); *G01S 5/0252* (2013.01); *G01S 5/0263* (2013.01);
(Continued)

(58) Field of Classification Search
CPC ...... G01S 11/06; G01S 5/0252; G01S 5/0263; H04B 10/116; H04B 17/318; H04W 64/006; H04W 4/023
See application file for complete search history.

(56) References Cited

U.S. PATENT DOCUMENTS

2012/0033658 A1 * 2/2012 Ganesan ............... H04W 36/18
370/338
2012/0056785 A1 3/2012 Jovicic et al.
(Continued)

FOREIGN PATENT DOCUMENTS

GB 2516832 A 2/2015
JP 2010197050 A 9/2010
(Continued)

OTHER PUBLICATIONS

International Search Report based on application No. PCT/EP2016/076928 (7 pages+ 3 pages English translation) dated Feb. 3, 2017 (for reference purpose only).
(Continued)

*Primary Examiner* — Wayne H Cai
(74) *Attorney, Agent, or Firm* — Viering, Jentschura & Partner MBB (57) ABSTRACT

A method for analyzing an environment of a mobile terminal by emission of unique identification data associated with at least one lighting device, by a light-based communication of the at least one lighting device, and determination of location coordinates of the mobile terminal in accordance with the identification data collected using an optical sensing unit of the mobile terminal with respect to the at least one lighting device, on the basis of the stored location coordinates of the at least one lighting device, each correlated with a respective installation position of the at least one lighting device, wherein provision of a respective sensor signal by at least one environmental signal sensor, extraction of envi-
(Continued)

ronmental data from the respective sensor signal, and storage of the environmental data in accordance with the location coordinates of the mobile terminal, causing existing environmental data to be updated.

12 Claims, 4 Drawing Sheets

(51) Int. Cl.
    *H04B 17/318*     (2015.01)
    *H04B 10/116*     (2013.01)
    *H04W 4/02*     (2018.01)
    *H04W 64/00*     (2009.01)

(52) U.S. Cl.
    CPC ......... *H04B 10/116* (2013.01); *H04B 17/318* (2015.01); *H04W 4/023* (2013.01); *H04W 64/006* (2013.01)

(56) References Cited

U.S. PATENT DOCUMENTS

| | | |
|---|---|---|
| 2013/0141554 A1 | 6/2013 | Ganick et al. |
| 2014/0038639 A1 | 2/2014 | Shi et al. |
| 2015/0349883 A1* | 12/2015 | Mitchell ............... H04B 10/116 398/118 |
| 2015/0377609 A1* | 12/2015 | Shen ....................... G01B 11/14 356/4.07 |

FOREIGN PATENT DOCUMENTS

| | | |
|---|---|---|
| WO | 2015148696 A1 | 10/2015 |
| WO | 2015195373 A1 | 12/2015 |

OTHER PUBLICATIONS

German Search Report based on application No. 10 2015 225 388.0 (8 pages) dated Sep. 22, 2016 (for reference purpose only).

* cited by examiner

METHOD AND SYSTEM FOR ANALYZING AN ENVIRONMENT OF A MOBILE TERMINAL

CROSS-REFERENCE TO RELATED APPLICATION

The present application is a national stage entry according to 35 U.S.C. § 371 of PCT application No.: PCT/EP2016/076928 filed on Nov. 8, 2016, which claims priority from German Patent Application Serial No.: 10 2015 225 388.0 which was filed Dec. 16, 2015, and is incorporated herein by reference in its entirety and for all purposes.

TECHNICAL FIELD

The description relates to a method for analyzing an environment of a mobile terminal. Furthermore, the description relates to a system for analyzing an environment of a mobile terminal.

SUMMARY

Light-based indoor navigation is based on the emission of a unique light-ID (LID), which may be received and detected by means of a mobile terminal. The LID is modulated onto the luminous flux, which is invisible to the human eye. In order to detect the modulated signal with a mobile terminal, there must be a visual connection (line of sight) between the detector and the modulated light source. The LID is filtered out of the light again and demodulated at the receiver. The LID may either directly contain position information itself, or else it may be determined indirectly via a lookup table. To this end, the lookup table contains a mapping between LIDs and position information. In addition to the position information, any other required metadata may be associated with the LID. This lookup table may be stored as an integrated part in an application which is running on the mobile terminal, or else stored on an external server unit, which the mobile terminal may access. Conversely, the lookup table may also include dynamic information, such as which mobile terminal has queried which position information. This allows a dynamic motion profile to be recorded (tracking) and saved with a time stamp (tracing). This motion information forms the basis for a wide range of location-based services and analyses.

A lighting device which transmits data to a mobile terminal is disclosed, as a non-limiting example, in WO 2015/148696 A1. This document discloses techniques for location-based actions by means of light-based communication.

The system only works, however, if a line-of-sight connection exists between the mobile terminal and the light source with the LID. If, for example, a mobile telephone (smartphone) is used as the mobile terminal and this is placed back into a pocket after the position query, while position information is indeed received that may be stored in the system, it is subsequently no longer possible to determine how the person or the mobile terminal has later changed position in the room.

In various embodiments of the present description a method and a system is provided which may allow a more detailed analysis of an environment of a mobile terminal.

The description includes a method for analyzing an environment of a mobile terminal by the emission of unique identification data associated with a lighting device by means of light-based communication by the lighting device, and by the determination of location coordinates of the mobile terminal in accordance with the identification data collected by means of an optical sensing unit of the mobile terminal with respect to the lighting device, on the basis of stored location coordinates of the lighting device that are correlated with a respective installation position of the at least one lighting device.

Various wireless, radio-based systems such as WLAN or Bluetooth may be used for determining position in buildings and thus for indoor navigation. In such methods, the position of the transmitter (a WLAN Access Point WAC or iBeacon) is known and on the basis of the signal field strength of the received signal (received signal strength, RSSI), the distance between the transmitter and the mobile receiver may be estimated. For a unique position determination at least three different transmission sources are required (trilateration). In order to further improve the system, a single reference measurement of an environment is performed. A so-called "fingerprint" is created, which means that different signal sources in the environment are detected and their signal field strengths determined. This results in a map which reproduces these different signal field lines from different sources with high positional accuracy.

On the basis of such a signal reference map, location coordinates may then be derived more quickly without time-consuming trilateration calculations, to enable the position of the receiver, for example in the form of a mobile terminal (smartphone), to be determined. At the same time, the mapping accuracy increases the greater the number of different static signal sources that are included. For a high quality acquisition of the environment in such a fingerprint map, it is essential to use an accurate position determination system for the measurement, to be able to assign the measured signals and information to a location as accurately as possible. The inventors have recognized that by using light-based communication it is possible to provide a very accurate position reference. By means of an optical sensing unit, such as a camera of the mobile terminal, it is thus possible to determine very accurately where the mobile terminal is located. In this way, a highly accurate location reference may be provided.

The light-based communication cannot be assumed to be available at all times, however. If the lighting device is turned off, for example, then no light-based communication may be provided. Moreover, the position determination by means of light-based communication presupposes a visual contact of the mobile terminal with the lighting device. Moreover, there may also be a need, for purposes of power saving or for reasons of data privacy, to turn off the optical sensing unit, in particular in the form of a camera. In such a case, therefore, only the other signal sources of the environment and the stored fingerprint map may be used for determining the respective location.

The signals of the signal sources in the environment may change over time, as a non-limiting example, their response may change over the course of their service life, or may be dismantled or reinstalled. In particular, a restructuring of the spatial conditions may also have a large influence on the signals. Thus, objects—in particular those made of metal—introduced into a room change the propagation of electromagnetic radiation.

The method is therefore extended by the provision of a respective sensor signal using at least one environmental sensor signal, the extraction of environmental data from the respective sensor signal, and storage of the environmental data in accordance with the location coordinates of the mobile terminal, causing already existing environmental data to be updated. Existing environmental data are here understood to mean such stored data as are correlated with the location coordinates and which formed valid environmental data, at least for a previous time interval. In no way does this data involve data which is present solely on the basis of a pre-assignment and/or initialization of a corresponding storage device with initial settings, for example in the form of specifiable bit patterns ($00_{hex}$/$FF_{hex}$), or based on random values.

The creation of a fingerprint map therefore does not represent a one-off operation, but instead is a continuous process, which means that the database is constantly updated with the most up-to-date information from the environment of a known location. In particular, it may be provided that at each determination of location coordinates of the mobile terminal by means of light-based communication, newly acquired environmental data is stored and used to update the existing environmental data. The use of the light-based communication for position determination means that already at the measurement and preparation stage of a fingerprint map, an inexpensive and sufficiently accurate system is provided, which delivers location information to an accuracy of less than 10 centimeters in all three spatial directions. The particular sensor signal is uniquely identifiable, for example via an identifier which is transmitted with the sensor signal, or by a characteristic frequency spectrum.

According to an advantageous extension, in the absence of identification data detectable using the optical sensing unit, in a further step the method includes the determination of the location coordinates of the mobile terminal in accordance with the environmental data extracted using the at least one environmental sensor signal. Therefore, after at least a single execution of the determination of location coordinates of the mobile terminal using light-based communication and the storage of the environmental data obtained in accordance with these location coordinates, a position determination is still possible even with a deactivated optical sensing unit and/or deactivated lighting device and/or in the absence of visual contact with the lighting device.

In the event that the location coordinates, which correspond to the current location of the mobile terminal, in connection with the associated environmental data have not yet been stored, in other words no exact correlation of location coordinates with the obtained environmental data exists, it may be provided that stored environmental data which correspond most closely to the currently obtained environmental data are determined by means of a specifiable criterion, for example, using the method of least squares. The location coordinates which are associated with the environmental data determined in this way may then be displayed on the mobile terminal, wherein it may be provided that an indication of the deviation from the actual position, in particular an indication of the estimated extent of the deviation, is additionally displayed. Due to the repeated updating of the stored environmental data, therefore, over time an increasingly detailed representation of the signal characteristics of the environment is obtained. In addition, it may be provided that the stored environmental data, which have values correlated to a particular signal source, are adjusted in a coordinated way when a change in the signal source, such as a decrease in the signal field strength, is detected. In this way, on the basis of one or—for a higher reliability—more executed processes of the determination of location coordinates in accordance with the light-based communication and the storage of the associated environmental data, such environmental data, for which no update measurement has been made directly at the associated location coordinates, may also be updated in the memory.

According to a further advantageous non-limiting embodiment, the method includes detection of a periodically changing physical environmental parameter to supply the sensor signal, wherein the environmental data contain values relating to at least one frequency and/or amplitude of the sensor signal. These values may be electric and/or magnetic fields, or changes in the intensity of light or sound. In addition to static signals therefore, alternating signals may also be included as unique information. In the case of alternating signals, the signal varies about an identifiable value, the mean value, with an identifiable amplitude and an identifiable frequency. The alternating signals form special patterns, which may assist in position determination. These patterns may also only occur temporarily and may interact with other signals from the environment, or influence them.

According to a further advantageous non-limiting embodiment of the method, it may be provided that the environmental data are stored in accordance with the respective time of day. The record of the environmental information and the corresponding analysis, that is, the extraction of the environmental data, may therefore also include fluctuations in the information dependent on the time of day. This means it is possible to record which signal source is active at which location and at which time and, where appropriate, with what signal intensity. The more measurements may be distributed over a day, the better the result in the fingerprint map produced from it. Conversely, by taking into account the time of day during the creation of the fingerprint map, this dependence may be minimized. Therefore, in an advantageous manner the fingerprint map is created as a function of the time of day. This means that signal sources, whose operating behavior is coupled to a predefined daily rhythm, may be advantageously taken into account in the preparation of the fingerprint map.

Alternatively or in addition to storing the environmental data in accordance with the time of day, it may be provided that the environmental data is stored in accordance with a specific environmental event. Here, for example, by evaluation of the at least one environmental sensor signal, it is possible to detect when a subway train is approaching a stop and a corresponding fingerprint map may then be used. Alternatively, the validity of a sensor signal may be masked, for example, if as a result of an approaching train in a station the detected sensor signal changes so much over the duration of the approach that no reliable conclusions may be drawn. In this case, a warning may be provided on the mobile terminal to the effect that, at the moment, only one signal based on the interference-resistant light-based communication is available—the sensor signal which is based for example, on the reception of a radio signal, is ignored.

According to a further advantageous non-limiting embodiment, the method includes the steps of testing the environmental data for the presence of a previously known environmental signal signature and displaying a device associated with the environmental signal signature for a user of the mobile terminal. In the evaluation of environmental information, a pattern recognition process may be performed. Conversely, from the change in the signal information, inferences may also be made about the environment itself. For example, if many visitors or customers are at the same place, then the signaling information changes significantly. This does not necessarily mean that other signal sources are positioned in the reception range, but that the additional objects change the fingerprint map. Based on this, the environmental data may be updated when an environment has changed significantly. When this occurs, a new measurement may be initiated, the old reference is now invalid without further intervention, and a self-learning process may therefore be implemented. Information may therefore be generated as to how many or how few people have been present in one place and when, or whether machines or electrical devices were in use, and even what kind of machines they were. Thus, a forklift truck generates a different environmental signal than, for example, a coffee machine. If these signal patterns are known, they may be used to derive conclusions about the environment and transmit this to other locations. Depending on the existing infrastructure, very specific patterns may occur, for example if a refrigerator has a significant radiation characteristic. If exactly such a pattern is detected, there is a high probability that another device of this kind is located at the respective place. Thus, a corresponding attribute may be entered in the fingerprint map, by means of which the presence of corresponding objects may be deduced. This allows, for example, a direction to a cooling facility to be displayed to a user of the mobile terminal.

If the mobile terminal is connected via a data connection to a data storage unit, in particular a central data storage unit in the form of a server in a network, which is designed to manage the fingerprint map, then the attributes relating to the correspondingly detected values may be transmitted to the data storage unit. In this way, the data determined may be supplied to other mobile terminals and/or their users. A corresponding updating of the fingerprint map in accordance with the presence of a previously known environmental signal signature may of course also be implemented independently on a mobile terminal.

According to a further advantageous non-limiting embodiment, the method has steps of comparing environmental data, in particular environmental data based on radio signals, with a specifiable reference, and issuing a warning signal when a value which is correlated with an intensity of the sensor signal underlying the environmental data falls below a specified reference value. The automatically generated fingerprint maps may also be used to detect defects or failures in the environment and report them back. The signal sources used are often primarily intended for mobile communication of data, and are only used as a source of positional information as a secondary function. But there are also signal sources that are used exclusively as sources of positional information, known as (radio) beacons (for example iBeacons). If a transmission source becomes continuously weaker due to, for example, the battery being discharged, or if it fails completely, this information may then be promptly forwarded to a maintenance service with details of the exact location.

According to a further advantageous non-limiting embodiment, the method includes logging the results of the determination of the location coordinates of the mobile terminal for a statistical analysis. This could enable, for example, the coverage of a cellular radio infrastructure to be determined and then used for an improvement in quality. In the automatic generation of fingerprint maps two types of information may be evaluated. Firstly, the available coverage of existing signal information sources is determined. Secondly, the actual querying and requesting of position information and the accuracy and frequency with which the requests take place are logged. This allows an optimal adjustment of demand on the locally provided infrastructure based on the local queries. In particular, this may involve logging and evaluating the nature of the query, the frequency of the query and the associated accuracy requirement.

According to a further advantageous non-limiting embodiment, the method includes the unique identification of the mobile terminal, wherein the environmental data are stored in accordance with the identity of the mobile terminal. The association of the determined environmental data with an identity of the mobile terminal with which the environment data were determined is particularly advantageous if the mobile terminal has a data connection to a central storage unit, such as a network server, to which other mobile devices also have access. This allows individual reception properties of the respective mobile terminal to be taken into account and/or the possibility that, depending on the features of the terminal used, no corresponding environmental signal sensor is available for the respective environmental parameter, such as a magnetic field sensor. Therefore, the system is constantly updated and improved automatically due to its use. Also, new sources of information for which no use is yet provided, or for which no sensors are yet available in the mobile terminal (smartphone), may be included at a later date. This requires simply updating a software application (app) on the mobile terminal.

Furthermore, the orientation of the mobile terminal may be integrated during the recording of the fingerprint map, which represents a further improvement in the database. In this method this feature may also be integrated automatically, which if done by manual acquisition would be very time-consuming. This also applies in particular to the problem of bodily shielding. Bluetooth and Zigbee, for example, operate in a frequency range in which water has a strong damping effect; the body of the person carrying the mobile terminal therefore shields the signal.

Further non-limiting embodiments may include a system for analyzing an environment of a mobile terminal, including the mobile terminal and at least one lighting device, which is designed to emit unique identification information associated with the lighting device using light-based communication. The mobile terminal is designed to determine location coordinates of the mobile terminal in accordance with the identification data detected using an optical sensing unit of the mobile terminal with respect to the lighting device, on the basis of location coordinates of the lighting device stored in a data storage unit and correlated in each case with a respective installation position of the at least one lighting device. The system according to the description is extended in such a way that the mobile terminal includes at least one environmental signal sensor for providing a respective sensor signal, wherein the mobile terminal is designed to extract environmental data from the respective sensor signal and wherein the system is designed to store the environmental data in accordance with the location coordinates of the mobile terminal, thereby causing already existing environmental data to be updated.

The lighting device may be implemented as an LED lamp, which in particular includes an LED lamp (LED module) and an electronic operating device (control unit) for operating the LED lamp. The mobile terminal may be a smartphone, tablet PC, laptop or mobile camera-supported sensing unit, especially for use in mobile robots.

According to an advantageous extension, the system includes a central server unit, which includes the data storage unit and is designed for a bi-directional communication link with the mobile terminal. This allows the environmental data to be stored centrally so that it is also available for other mobile terminals. The central server unit is not necessarily bound to a physical network component, it may, of course, be implemented as a virtual machine, for example, in a so-called cloud.

According to an alternative non-limiting embodiment of the system it may be provided that the data storage unit is implemented as an internal memory unit on the mobile terminal. In this case, the environmental data obtained may be stored directly on the mobile terminal. In this case the environment data is also advantageously stored on the data storage unit itself, in other words, on the mobile terminal. The data storage unit on the mobile terminal may of course be assembled from different physical storage units, for example an internal memory of the mobile terminal and a plug-in card, such as a micro-SD card.

It may also be alternatively provided that, depending on availability, a data storage unit on a server unit and/or an internal/external data storage unit of the mobile terminal are used. Particularly advantageously, a local storage on the mobile terminal and a server-based storage outside of the mobile terminal may be provided.

Depending on the specific design of the data storage unit either as a central data storage unit on a server unit or as a distributed storage unit on the respective mobile terminal unit, the location coordinates of the mobile terminal may be determined on the server unit itself or on the mobile terminal. It is also conceivable for raw positional data to be provided to the mobile terminal by a server unit, wherein appropriate calculations are performed on the mobile terminal, which ultimately lead to the determination of the location coordinates of the mobile terminal.

The advantage of a solution according to the invention is that, even if no line-of-sight connection to a light-based navigation system is available, the latest fingerprint maps may always be accessed, therefore enabling the best possible non-light-based position determination. In particular, using the method for continuous recording of signal and environmental information for the optimization of positioning systems, the system is constantly updated and improved automatically in use. The described method may also be applied to other positioning systems. In this case the most accurate tracking system is always assumed, on the basis of which a reference measurement is carried out. Other systems which do not use this exact positioning system may therefore fall back on the generated reference maps (fingerprint map).

The described advantages and embodiments of the method also apply to the system according to the description and vice versa. Consequently, corresponding device features may be provided for method features, and vice versa.

The features and feature combinations cited in the description above, and the features and feature combinations cited in the description of the figures below and/or shown in the figures alone are applicable not only in the respective combination indicated but also in other combinations or in isolation, without departing from the scope of the description. Therefore, such embodiments are also to be considered as disclosed by the description as are not explicitly shown or explained in the figures, but which emerge from and may be generated from the embodiments described by separate feature combinations.

Further advantages and features are obtained based on the following description of embodiments, taking into account the attached figures. In the figures, identical reference numerals designate identical or similar elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings in which.

DETAILED DESCRIPTION

The creation of a so-called fingerprint map is based on the fact that available signal sources, which are uniquely identifiable, are evaluated with respect to their reception parameters existing at a specified location. Radio transmitters which have proved to be especially suitable for this are those in which the signal strength of the electric or magnetic field decreases inversely with the distance to the signal source or its transmitting antenna.

Figure 1:
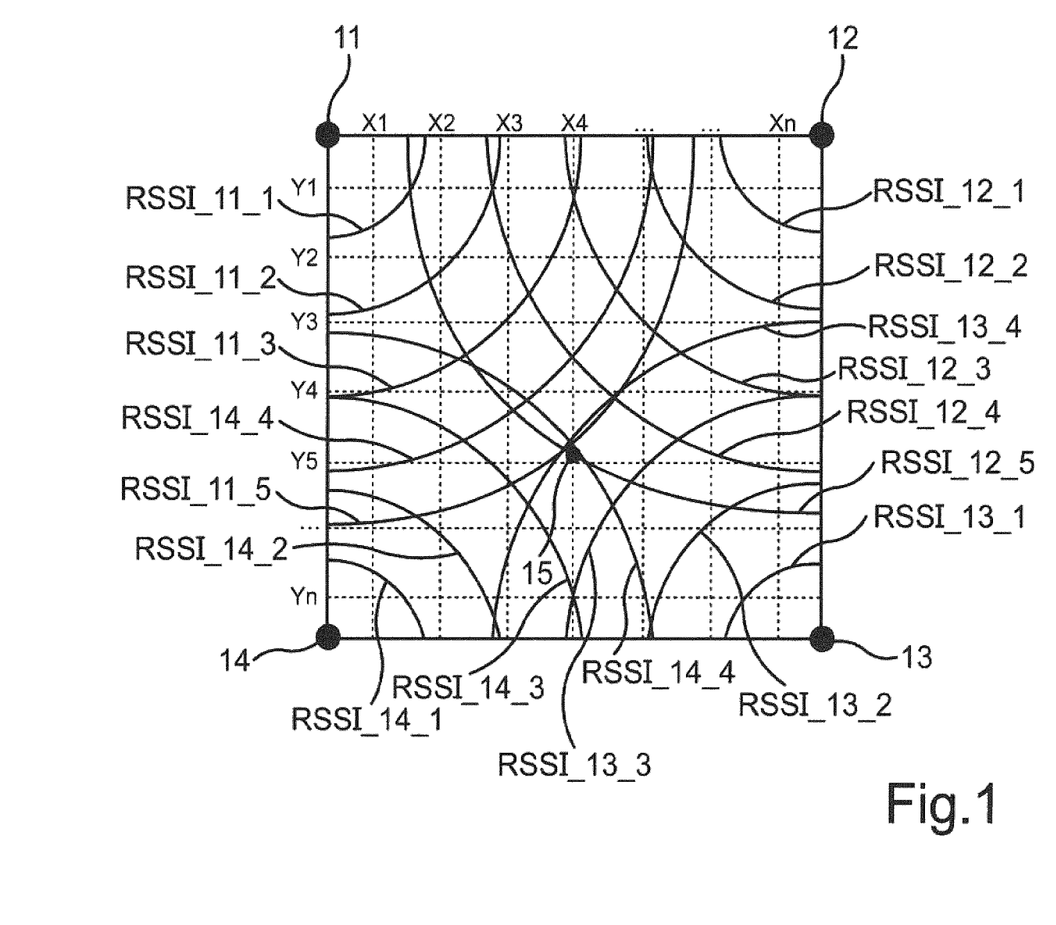
FIG. 1 a simplified schematic representation of a first arrangement of a mobile terminal within the range of influence of a plurality of signal sources, FIG. 2 a simplified schematic representation of a second arrangement in modified form, FIG. 3 a simplified schematic representation of a non-limiting embodiment of a system according to the description, and FIG. 4 a simplified schematic representation of a non-limiting embodiment of a method according to the invention.

An arrangement shown in FIG. 1 includes a mobile terminal 15 and a first signal source 11, a second signal source 12, a third signal source 13 and a fourth signal source 14. The four signal sources 11, 12, 13, 14 are arranged at the corners of a rectangle, superimposed with a right-angled coordinate grid. In a horizontal direction from left to right, X-coordinates with the values X1, X2, X3, and X4 to Xn are entered, and in a vertical direction from top to bottom, Y-coordinates with values of Y1, Y2, Y3, Y4, Y5 to Yn are entered.

For each of the four signal sources 11, 12, 13, 14, lines of equal signal strength ("contour lines") are drawn, the numbering of which begins with 1 in each case for the line nearest to the respective signal source and thus represents the highest level of the signal strength shown that is represented by the individual lines of the equal signal strength contour, the corresponding signal strength decreases accordingly with increasing distance from the respective signal source and hence with ascending number.

This results in a first set of lines of a graded signal strength contour RSSI_11_1, RSSI_11_2, RSSI_11_3, RSSI_11_4, RSSI_11_5, which is associated with the first signal source 11. In the same way, a corresponding set of second lines of an equal signal strength contour is obtained, which is correlated with the second signal source 12, namely RSSI_12_1, RSSI_12_2, RSSI_12_3, RSSI_12_4, RSSI_12_5. Similarly, a third set of lines of an equal signal strength contour is obtained, which is associated with the third signal source 13 and includes the lines RSSI_13_1, RSSI_13_2, RSSI_13_3, RSSI_13_4. Correspondingly, a fourth set of lines of equal signal strength RSSI_14_1, RSSI_14_2, RSSI_14_3, RSSI_14_4 is associated with the fourth signal source 14.

A mobile terminal 15 is arranged in the right-angled grid at the coordinates X4/Y5. The lines of equal signal strength are shown in FIG. 1 only to the extent necessary for determining the particular value for the mobile terminal 15. Therefore, in accordance with the arrangement shown, at the location of the mobile terminal 15 the signal of the first signal source 11 may be received with a signal strength which lies in the region of the signal strength contour RSSI_11_5, in the region of the signal strength contour RSSI_12_5, in the region of the signal strength contour RSSI_13_4 and in the region of the signal strength contour RSSI_14_4.

Advantageously, irrespective of the respective signal source 11, 12, 13, 14, the lines of equal signal strength each characterize a region of equal value for the associated signal field strength, in other words, for example, the second signal source 12 on the second line RSSI_12_2 is therefore received just as strongly as the fourth signal source line 14 on the line RSSI_14_2.

Figure 2:
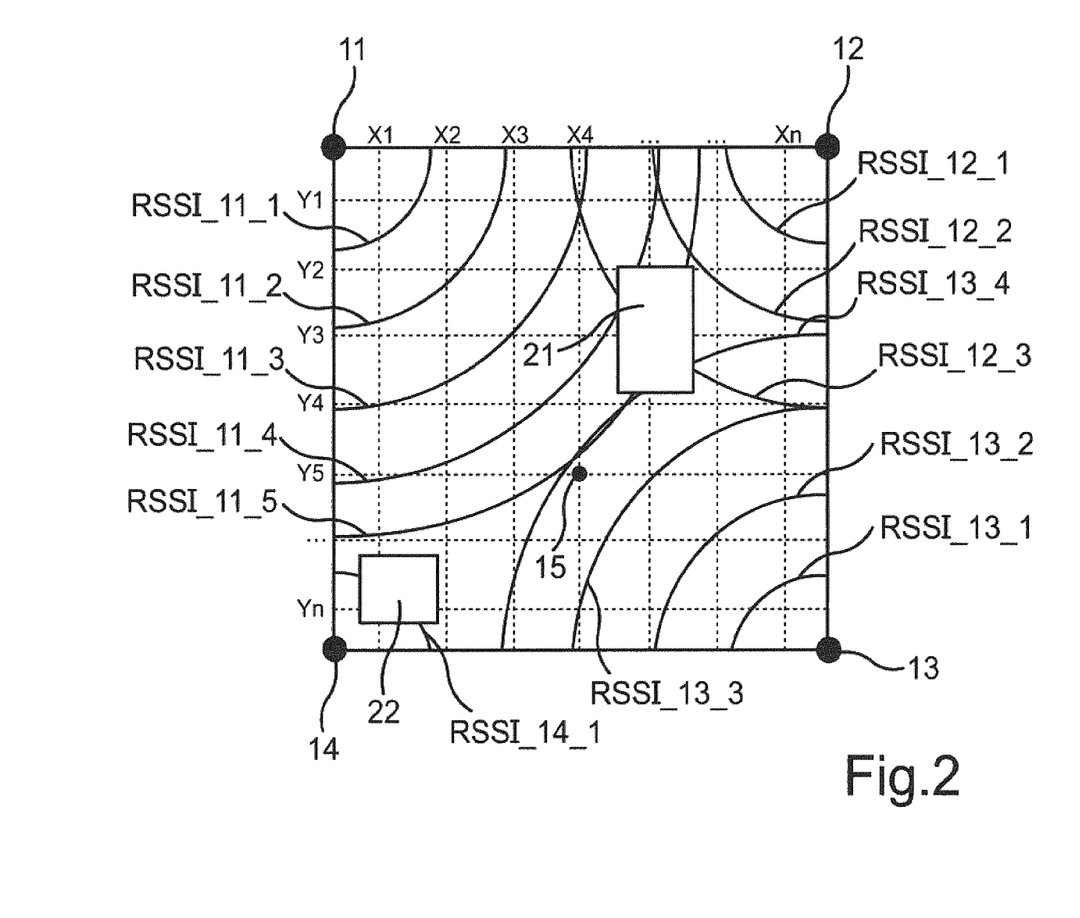

FIG. 2 shows the same arrangement of the mobile terminal 15 within the four signal sources 11, 12, 13, 14, wherein in contrast to the representation in FIG. 1 a first object 21 and a second object 22 are now introduced into the space, with corresponding effects on the propagation of the signals radiated by the respective signal sources 11, 12, 13, 14.

The signal radiated by the first signal source 11 is impeded neither by the first object 21 nor by the second object 22 on its route to the mobile terminal 15, so that it is still the case, as before in the illustration of FIG. 1, that the first signal source 11 is received with a signal strength in the region of the line RSSI_11_5. The same applies mutatis mutandis in respect of the third signal source 13, where the direct line of sight between the mobile terminal 15 and the third signal source 13 is also not altered by either of the two objects 21, 22, so that an undisturbed signal propagation is still possible here. As a result, the reception of the signal radiated by the third signal source 13 is possible at the position X4/Y5 in the region of the line RSSI_13_4.

However, the first object 21 is located directly between the second signal source 12 and the mobile terminal 15 and therefore impedes an undisturbed propagation of the signal radiated by the second signal source 12. For the sake of simplicity therefore, only three lines RSSI_12_1, RSSI_12_2 and RSSI_12_3 are shown. Due to the size of the first object 21, the signal 15 at the coordinates X4/Y5 is completely shielded (No_RSSI_12).

In a similar way, the second object 22 is located directly between the fourth signal source 14 and the mobile terminal 15. Although the second object 22 is smaller than the first object 21, it is located at a much shorter distance from the fourth signal source 14 than the first object 21 is from the second signal source 12, and therefore even more strongly impedes the undisturbed propagation of the signal radiated by the fourth signal source 14. For the sake of simplicity, only one line RSSI_12_1 is therefore shown. Therefore, the signal of the fourth signal source 14 may also no longer be received at the coordinates X4/Y5, at which the mobile terminal 15 is located (No_RSSI_14).

Under the simplifying assumption that the numbering of the signal field strength lines is inversely related to the receivable signal strength in each case, the value of a signal strength vector {RSSI_11/RSSI_12/RSSI_13/RSSI_14} at the position (X4/Y5) in the first arrangement is given by: {0.2/0.2/0.25/0.25} or in the environment disturbed by the first object 1 and the second object 2 according to the second arrangement by: {0.2/0/0.25/0}.

Thus, subsequent changes in the environment give rise to a significant change in the distribution of the respective signal strengths, so that either completely incorrect values for the X-coordinates and/or Y-coordinates are determined, or no coordinates may actually be found that may be matched with such a combination of values.

Therefore, the relevant environmental data are advantageously determined at every available opportunity, thus in the present example, value pairs of the respective signal strengths RSSI_11, RSSI_12, RSSI_13, RSSI_14 are matched.

Figure 3:
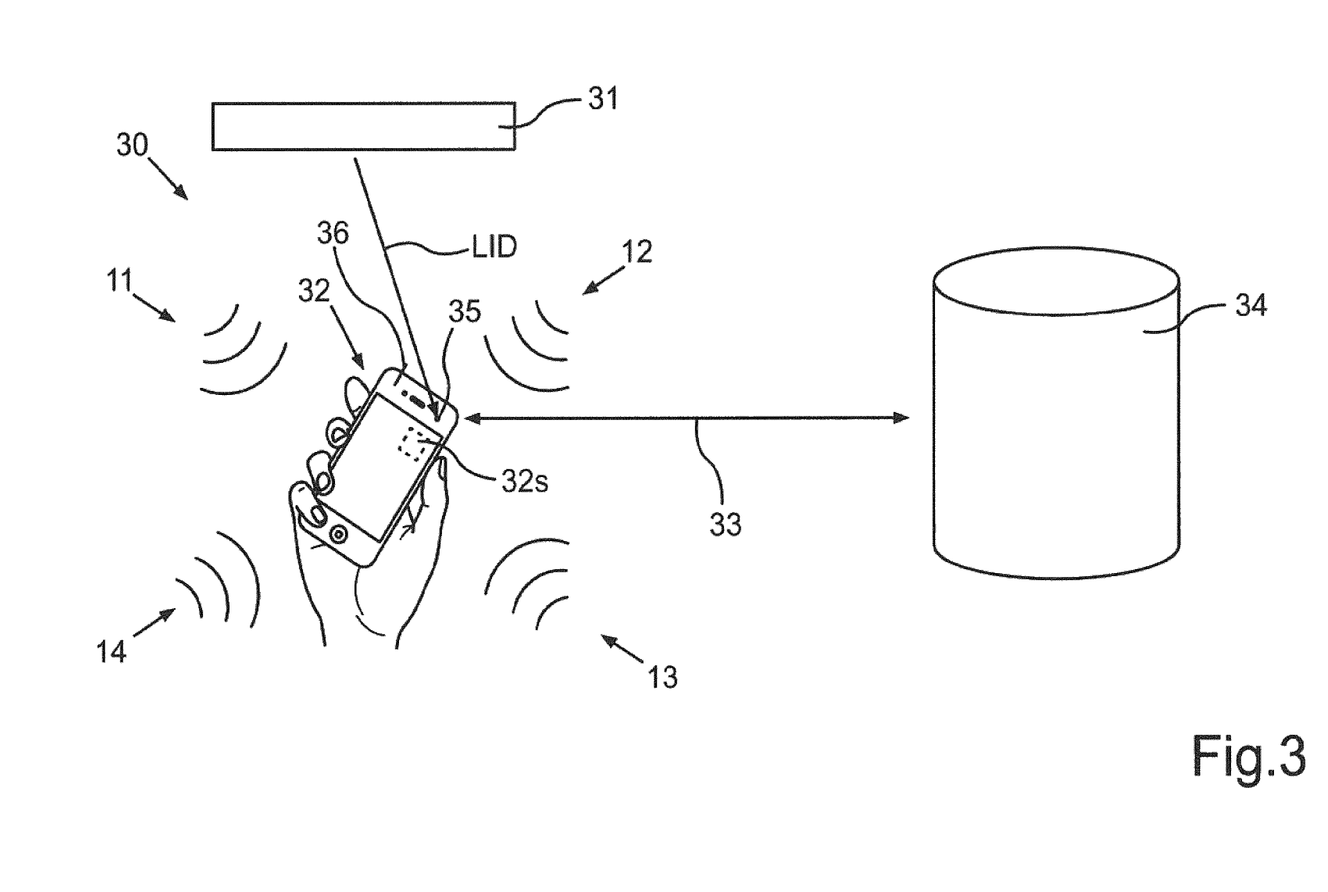

FIG. 3 shows a non-limiting embodiment of a system according to the description. The system 30 includes a lamp 31, a smartphone 32 and a central server unit 34. The lamp 31 emits a light-ID LID, which may be received by a camera 35 of the smartphone 32. A data connection 33 exists between the smartphone 32 and the central server unit 34. The smartphone 32 also includes a radio receiver module 36, which is designed to receive radio signals of the first signal source 11, the second signal source 12, the third signal source 13 and the fourth signal source 14, in the range of influence of which the smartphone 32 is located.

The smartphone 32 as shown in FIG. 3 therefore corresponds to the receiver 15 of the illustrations in FIGS. 1 and 2. The radio receiver module 36 is designed to determine a signal strength for each of the received radio signals, specifically a first signal strength RSSI_11 of the first signal source 11, a second signal strength RSSI_12 of the second signal source 12, a third signal strength RSSI_13 of the third signal source 13 and a fourth signal strength RSSI_14 of the fourth signal source 14.

Via the data connection 33, the light-ID LID may be transmitted to the central server unit 34, and the respective signal strengths RSSI_11, RSSI_12, RSSI_13, RSSI_14 may also be transmitted to the central server unit 34. In return, a position indication determined from any one of them, for example in the form of X-coordinates and Y-coordinates, may be transmitted back to the smartphone 32.

Optionally, the smartphone 32 may be equipped with a decentralized storage unit 32s in the form of an internal, permanently installed memory component or an external plug-in memory component, for example in the form of a SD card, in particular in the form of a micro-SD card, which provides the required data for the position determination instead of the central server unit 34. This may be implemented, for example, by the necessary information being downloaded from the central server unit 34 in advance and then being available offline even without an existing data connection 33. Of course, the environmental data, which in the meantime have been updated in the distributed storage unit 32s, may be subsequently synchronized with the central server unit 34 again when a data connection 33 to this is restored.

Figure 4:
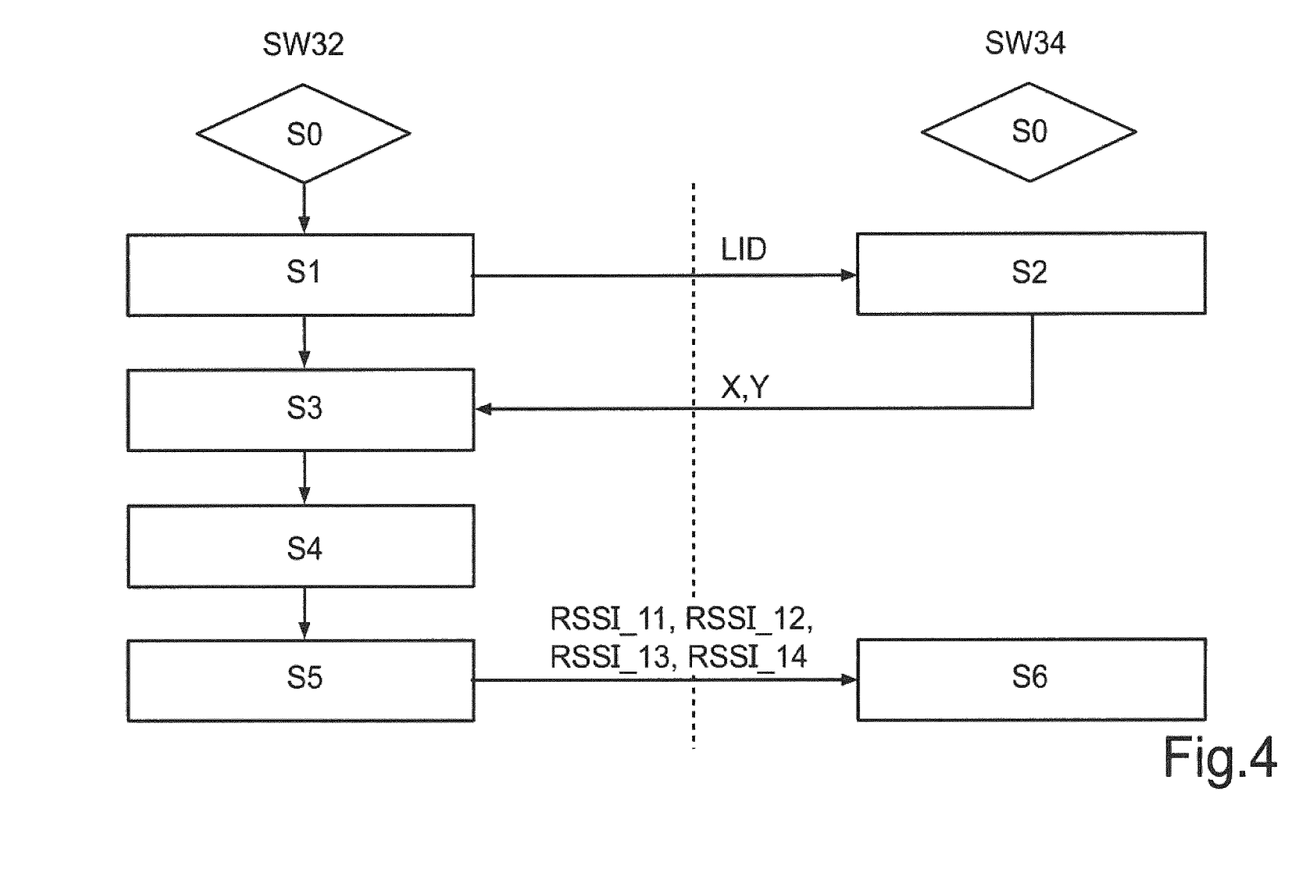

FIG. 4 shows a non-limiting embodiment of a method according to the description. The execution of the individual method steps is split into a software application SW32, which runs on the smartphone 32, and a software application SW34, which is executed on the central server unit 34. The execution always begins at a start S0. In a first step S1 the smartphone 32 makes a position determination query using light-based communication, wherein the light-ID LID is transmitted to the central server unit 34. From this, in a second step S2 the central server unit 34 determines the position of the smartphone 32, which is intended to represent any mobile terminal, and transmits the associated X-coordinate X and Y-coordinate Y to the smartphone 32, which receives and further processes them in a third step S3.

Subsequently the smartphone 32 executes a fourth step S4, in which a measurement is initiated to determine environmental data. In a fifth step S5, the determined environmental data in the form of the signal strengths RSSI_11, RSSI_12, RSSI_13, RSSI_14 (first signal strength, second signal strength, third signal strength, fourth signal strength) are transmitted to the central server unit 34, where in a sixth step S6, the so-called fingerprint map is updated. In this step both the environmental data and the associated position data, for example in the form of the X-coordinate X and the Y-coordinate Y, are stored.

In a first implementation stage (first step S1, second step S2, third step S3), the light-based navigation system is used to determine the position, as described above. In a second stage (fourth step S4, fifth step S5, sixth step S6), all available information is collected from the environment (such as the signal field strength of transmitters present in the surrounding area, for example mobile radio networks, WiFi, bluetooth, Ultra-Wide-Band, magnetic field, Earth's magnetic field or electromagnetic fields due to current-carrying wires or machines, light intensity, for example through windows, acoustic signals) and transmitted to a database in the form of the central server unit 34. This process is triggered in the background, for example, when a user performs an exact (light-based) position determination via their smartphone 32.

The continuous recording of the signals from the environment results in a constantly updated fingerprint map with current time, location and signal information. This also compensates, for example, for the above-mentioned disadvantage which occurs when using only a single measurement to create the fingerprint map, that changes in the environment modify the signals. This considerably improves the accuracy and reliability in spatial resolution for devices that do not use light-based positioning.

The embodiments are used only for explaining the invention, and do not limit its scope. In particular, the location of the execution of method steps may be relocated from the smartphone 32 to the central server unit 34 and/or from the central server unit 34 to the smartphone 32, without departing from the idea of the invention.

It has therefore been shown in the foregoing how a reference information source may be created for highly accurate positioning in buildings.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE NUMERALS first signal source 11
second signal source 12
third signal source 13
fourth signal source 14
receiver 15
system 30
lamp 31
smartphone 32
distributed storage unit 32s
data connection 33
central server unit 34
camera 35
radio receiver module 36
light-ID LID
first signal strength RSSI_11
second signal strength RSSI_12
third signal strength RSSI_13
fourth signal strength RSSI_14
first set of signal strength contours RSSI_11_1, RSSI_11_2, RSSI_11_3, RSSI_11_4, RSSI_11_5
second set of signal strength contours RSSI_12_1, RSSI_12_2, RSSI_12_3, RSSI_12_4, RSSI_12_5
third set of signal strength contours RSSI_13_1, RSSI_13_2, RSSI_13_3, RSSI_13_4
fourth set of signal strength contours RSSI_14_1, RSSI_14_2, RSSI_14_3, RSSI_14_4
start S0
first step S1
second step S2
third step S3
fourth step S4
fifth step S5
sixth step S6

The invention claimed is:

1. A method for analyzing an environment of a mobile terminal by:
   emitting unique identification data associated with at least one lighting device, by a light-based communication of the at least one lighting device, wherein a determination of location coordinates of the mobile terminal is made in accordance with the identification data collected using an optical sensing unit of the mobile terminal with respect to the at least one lighting device, on the basis of stored location coordinates of the at least one lighting device, each correlated with a respective installation position of the at least one lighting device,
   receiving two or more environmental signals; determining environmental data from the two or more environmental signals, wherein the environmental data comprises a graded signal strength of each signal from the two or more respective environmental signals; and storing the environmental data in accordance with the location coordinates of the mobile terminal causes existing environmental data to be updated;
   determining the location coordinates of the mobile terminal based on the graded signal strength of each environmental signal when the unique identification data from the at least one lighting device is shielded from an output of the optical sensing unit.

2. The method as claimed in claim 1, further comprising:
   detecting a periodically changing physical environment parameter to supply the environmental signals, wherein the environmental data contain values relating to at least one of frequency and/or amplitude of the one or more sensor signals.

3. The method as claimed in claim 1, wherein
   the environmental data is stored in accordance with a respective time of day.

4. The method as claimed in claim 1, further comprising:
   testing the environmental data for the presence of a previously known environmental signal signature, and
   displaying a device associated with the environmental signal signature for a user of the mobile terminal.

5. The method as claimed in claim 1, further comprising:
   comparison of the environmental data, in particular environmental data based on radio signals, with a specifiable reference, and
   issuing a warning signal if a value, correlated with an intensity of the environmental signal underlying the environmental data, falls below a specified reference value.

6. The method as claimed in claim 1, further comprising:
   logging of results of the determination of the location coordinates of the mobile terminal for a statistical analysis.

7. The method as claimed in claim 1, further comprising:
uniquely identifying the mobile terminal, wherein the environmental data are stored in accordance with the identity of the mobile terminal.

8. The method as claimed in claim 1, wherein the mobile terminal dynamically receives the two or more respective environmental signals without user input.

9. A system for analyzing an environment of a mobile terminal, comprising:
the mobile terminal, and
at least one lighting device, configured to emit identification data associated with the at least one lighting device by a light-based communication, wherein the mobile terminal is designed to determine location coordinates of the mobile terminal in accordance with the identification data detected using an optical sensing unit of the mobile terminal with respect to the at least one lighting device, on the basis of the location coordinates of the at least one lighting device stored in a data storage unit and correlated in each case with a respective installation position of the at least one lighting device,
wherein the mobile terminal comprises two or more ambient sensors for receiving a respective environmental signal, wherein the mobile terminal is configured to extract environmental data from the two or more respective environmental signals, wherein the environmental data comprises a graded signal strength of each environmental signal; and wherein the system is configured to store the environmental data in accordance with the location coordinates of the mobile terminal, causing already existing environmental data to be;
determining the location coordinates of the mobile terminal based on the graded signal strength of each environmental signal when the unique identification data from the at least one lighting device is shielded from an output of the optical sensing unit.

10. The system as claimed in claim 9,
wherein a central server unit, which comprises the data storage unit, is configured for a bi-directional communication link with the mobile terminal.

11. The system as claimed in claim 9,
wherein the data storage unit is implemented as an internal memory unit on the mobile terminal.

12. The system as claimed in claim 9, wherein the mobile terminal dynamically receives the two or more respective environmental signals without user input.

* * * * *